Feb. 16, 1960

SHAO W. YUAN ET AL 2,925,129

ROTOR CONTROL

Filed April 26, 1957

INVENTORS
Shao Wen Yuan.
Theodore Von Kármán.

BY Herbert M. Birch

ATTORNEY

Feb. 16, 1960  SHAO W. YUAN ET AL  2,925,129
ROTOR CONTROL
Filed April 26, 1957  6 Sheets-Sheet 2

INVENTORS
Shao Wen Yuan
Theodore Von Kármán

BY Herbert M. Birch
ATTORNEY

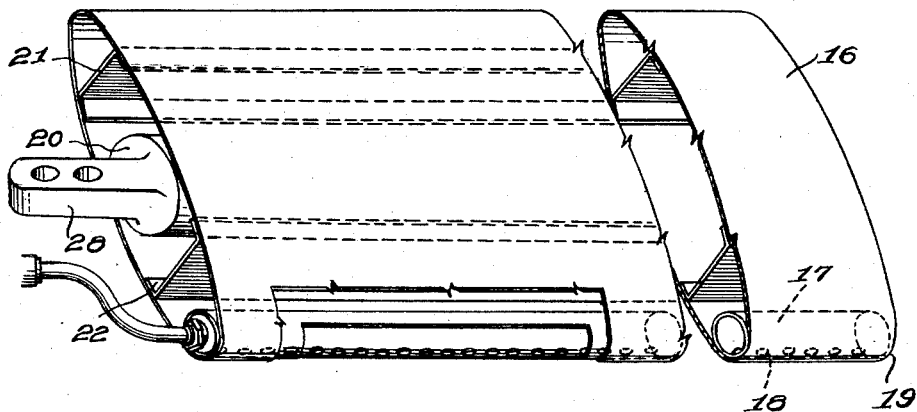
Fig. 5.
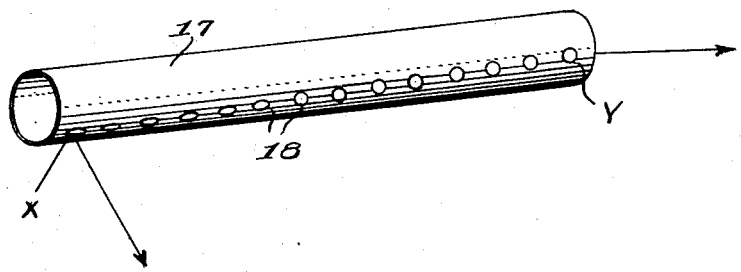
Fig. 6.
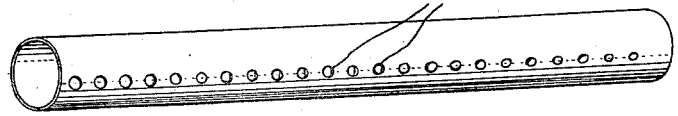
Fig. 7.
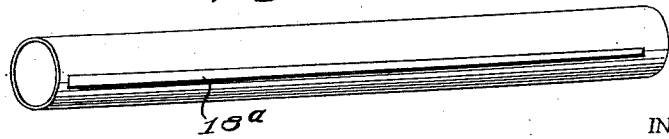
Fig. 7-A.
INVENTORS
Shao Wen Yuan.
Theodore Von Kármán
BY Herbert M. Birch
ATTORNEY Feb. 16, 1960  SHAO W. YUAN ET AL  2,925,129
ROTOR CONTROL
Filed April 26, 1957  6 Sheets-Sheet 4
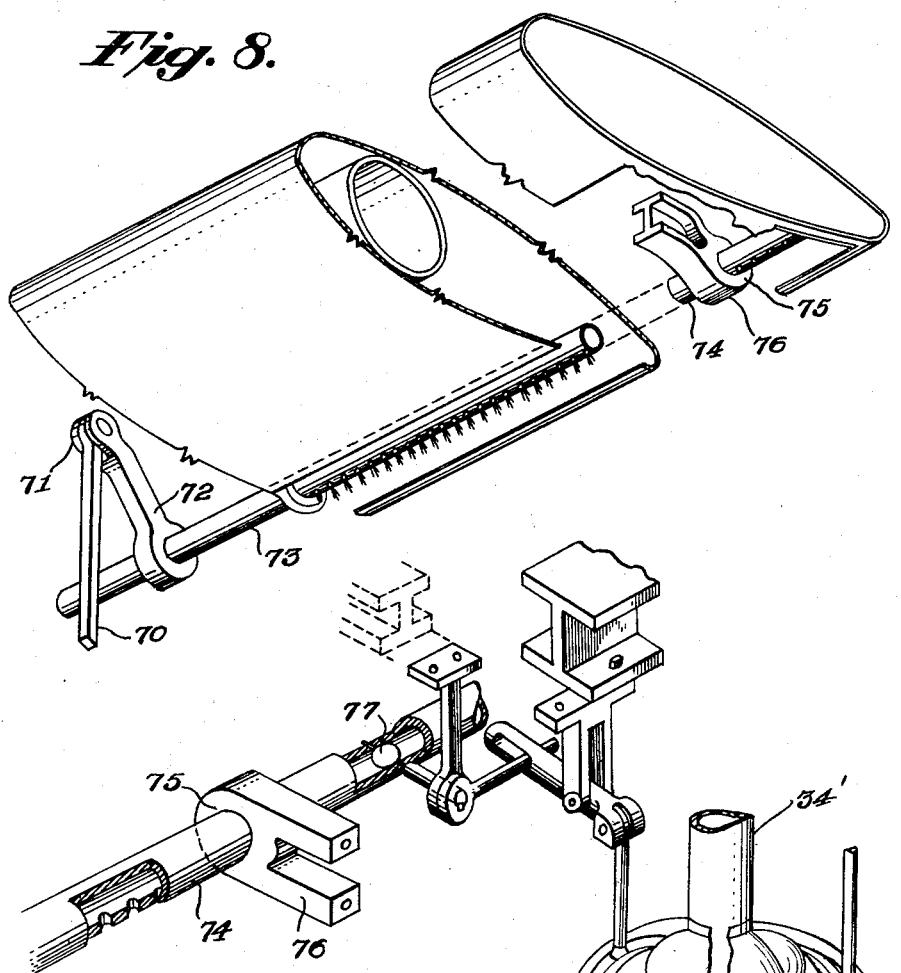
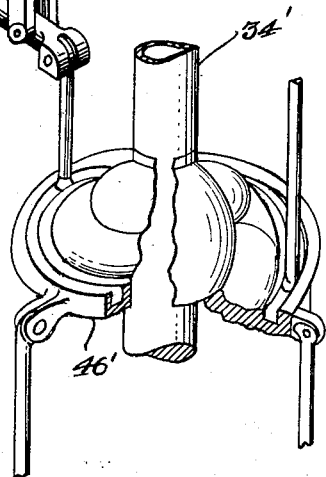
INVENTORS
Shao Wen Yuan.
Theodore Von Kármán
BY *Herbert M. Birch*
ATTORNEY

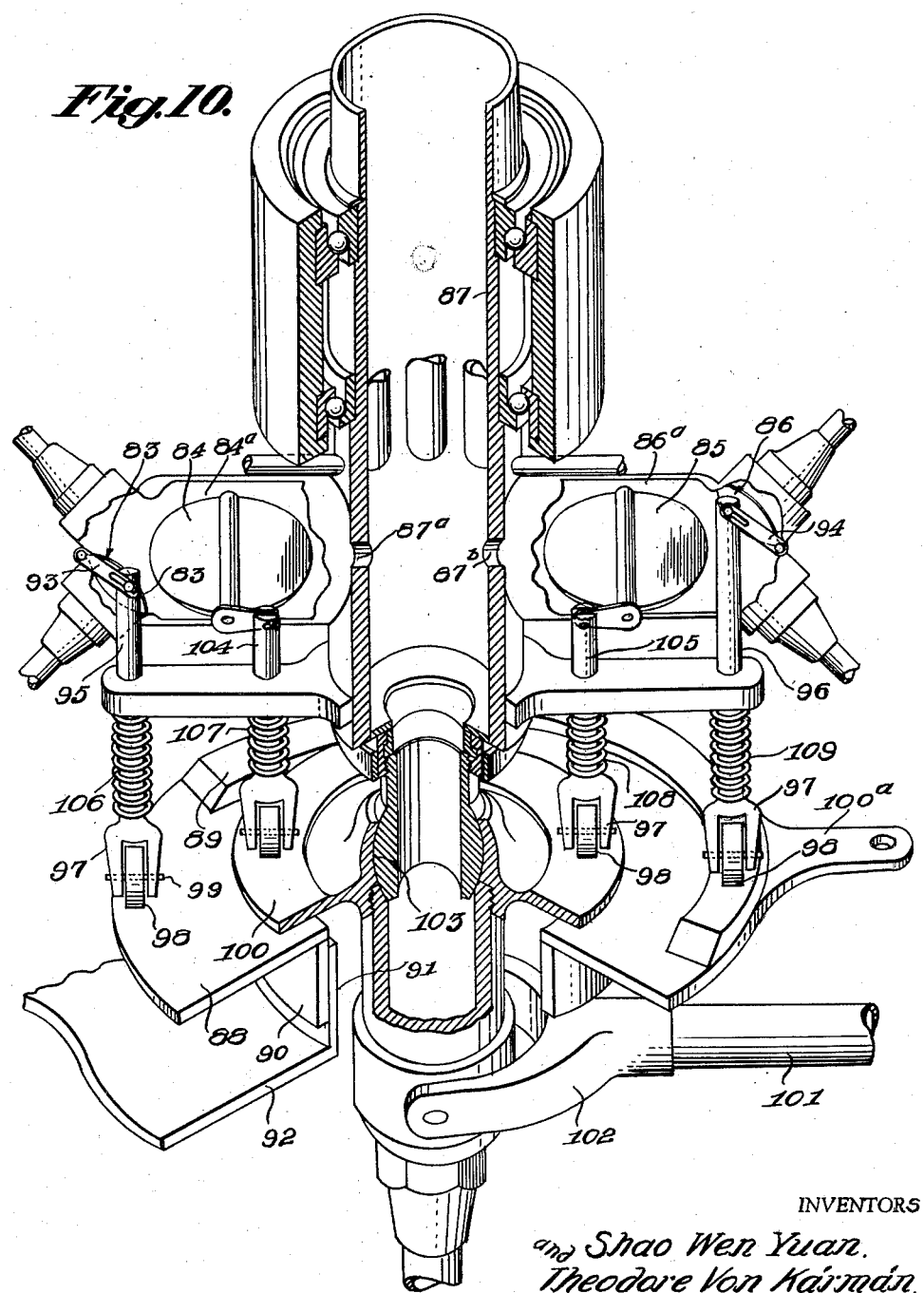

INVENTORS
Shao Wen Yuan.
Theodore Von Kármán

BY Herbert M. Birch
ATTORNEY

United States Patent Office 2,925,129
Patented Feb. 16, 1960

2,925,129
ROTOR CONTROL

Shao W. Yuan, New York, N.Y., and Theodore von Kármán, Pasadena, Calif.

Application April 26, 1957, Serial No. 655,419

22 Claims. (Cl. 170—135.4)

The present invention relates to rotary wing aircraft of all types, such as helicopters, autogyros, gyrodynes, convertible craft and the like, including lifting cranes.

It is an important object of the invention to provide a rotor blade for rotary wing type aircraft having new and improved means for altering its lift characteristic during its rotation, so that a very high lift and a thrust is imparted to the blade without the necessity of changing the angle of attack or the camber of the blade.

For accomplishing the foregoing object, the invention more particularly contemplates the use of a rotor blade having a cross-sectional shape which resembles an elongated flattened oval with one or more slots around the trailing edge for blowing jets of fluid, said jets being mounted so as to be capable of being adjustably displaced with respect to the blade, to attain a desired very high lift and thrust.

Another important object of the invention is to provide a symmetrically formed blade, such for example as an oval shaped rotor blade system for rotary-wing type aircraft and applying blowing jets or blasts of fluid around the leading edges of the blades during their retreating interval. This arrangement gives the portion of the blade which experiences reverse flow, lift similar to that of the advancing sections, which are experiencing the forward flow condition. Hence this arrangement eliminates the forward speed limitation of the conventional rotary-wing type aircraft caused by the low lift produced by the usual retreating blade.

Still another object of the invention is to provide a novel system for a rotary-wing type aircraft, whereby the blades have a new and improved means for cyclically altering their lift characteristic during their rotation, so that additional lift is imparted to each blade throughout the retreating portion of its cycle without the necessity of changing the angle of attack or the camber of the blade.

A further object of the invention is to provide a rotary-wing type aircraft rotor blade of the above character having control means operable by the pilot for changing the magnitude of the lift imparted by the orientation of the blowing jets and for attaining directional control of the rotary wing type aircraft while in flight.

Still a further object of the invention is to provide blowing jets along the span of the blade with different magnitude and orientation with respect to the blades, to thereby give different lift coefficients along the blade section, which in turn gives a favorable spanwise lift distribution.

Still a further object of the invention is to provide a contribution to propulsion of the rotor blades by the horizontal component of the reactive forces of blowing jets. Thus this system may eliminate the mechanical driven shaft system, whereby great saving in weight and a great increase in the efficiency of the rotors are accomplished.

Another object is to provide jet means to induce the flow of the air stream upon the upper side of the blade around the trailing edge and smoothly off along the jet stream, whereby certain circulation, as the cause of the lift, is created and in addition the vertical component of the reaction of the jet gives further lifting force, while the component of the momentum of blown air in the direction of the main air stream contributes a thrust to propel the blade's rotation.

Another object is to provide novel means to control rotary wing aircraft, so that certain conditions of flight may be efficiently controlled by jet means to provide for substantial equalization of lift for the advancing and retreating blades, the hovering, vertical ascending and vertical descending conditions, and for forward and sidewise flight and control due to gust conditions.

Still another object is to provide means for shifting the air or gas supply from the rotor blade's trailing edge to the blade's leading edge during rotation of the rotor. For example, at high transverse speeds of a rotor, a portion or all of the retreating blade at a certain position experiences a reversal of relative airflow. This produces a condition of no lift or even a negative lift on a conventional airfoil with a positive angle of incidence. Thus it is an object to overcome this condition in a rotor by the novel arrangement of jets in the blade leading edge as well as in the trailing edge. Thus, when the flow is reversed over a retreating blade, the air jet supply is shifted from the blade trailing edge to the blade leading edge and the blade lift is regained.

A further object is to provide a novel air flow distributing system adapted to be cyclically controlled by the pilot of the craft.

Still a further object is to eliminate the mechanical linkage of conventional rotor blades, which linkage is required to vary the rotor blade incidence both collectively and cyclically by rotation of the blade about its pivoted spanwise axis to prevent sidewise overturning movement; by compensating for changes made in the blade lift with predetermined location of jet means along the wing edges and by directing the air mass flow to the jet means to the proper blade or to the proper zone in the blade at the proper time.

With the foregoing and other objects in view, which will become apparent as the invention is fully understood, the same resides in the novelty of construction, combination and arrangement of elements hereinafter described in detail and distinctly claimed in the appended claims.

The description should be read in conjunction with the accompanying drawings wherein:

Figure 1 is a side perspective view partly in section of a rotary wing assembly without the aircraft body to conserve space;

Figure 2 diagrammatically illustrates a theoretical or desired flow around an oval airfoil with fluid flow lines;

Figure 5 is a broken perspective view of one form of airfoil with a single elongated jet duct mounted in the trailing edge thereof;

Figure 6 shows an arrangement of jet orifice at angles with respect to each other along the airfoil to provide a desired distribution of circulation, hence lift;

Figure 7 shows another arrangement of jet openings of graduated sizes;

Figure 11:
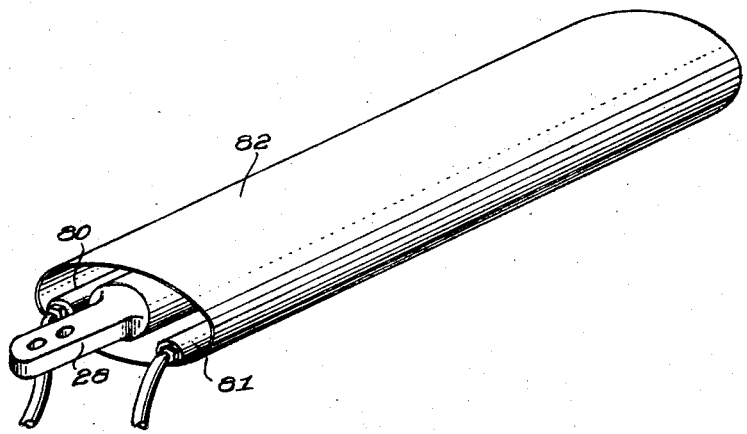
Figure 12:
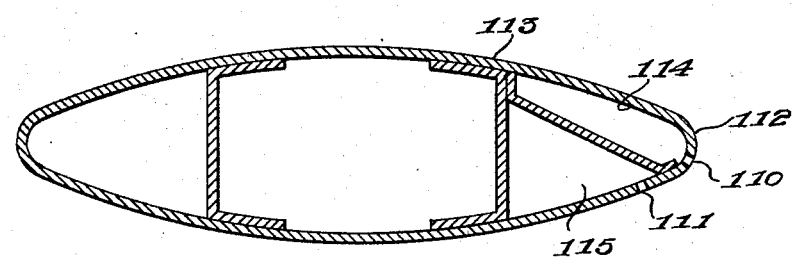

Figure 7-A is a view similar to Fig. 7 with an infinite number of jet openings in the form of a slot;

Figure 8 illustrates a novel pilot operating means for orientation of the duct and jet directions for controlling the lift for certain flight conditions;

Figure 9 is an illustration of cyclic means for controlling the lift by jet momentum;

Figure 10 is another form of cyclic control for variably supplying the control jets to activate the jet means in the leading or trailing edge of the rotor blade to provide greater lift force in the reverse flow region;

Figure 11 is a perspective view of a rotary blade having jet ducts in both the leading and the trailing edge; and Figure 12 is still another embodiment of jet control means in a trailing edge with at least two elongated spans of jets.

Figure 1:
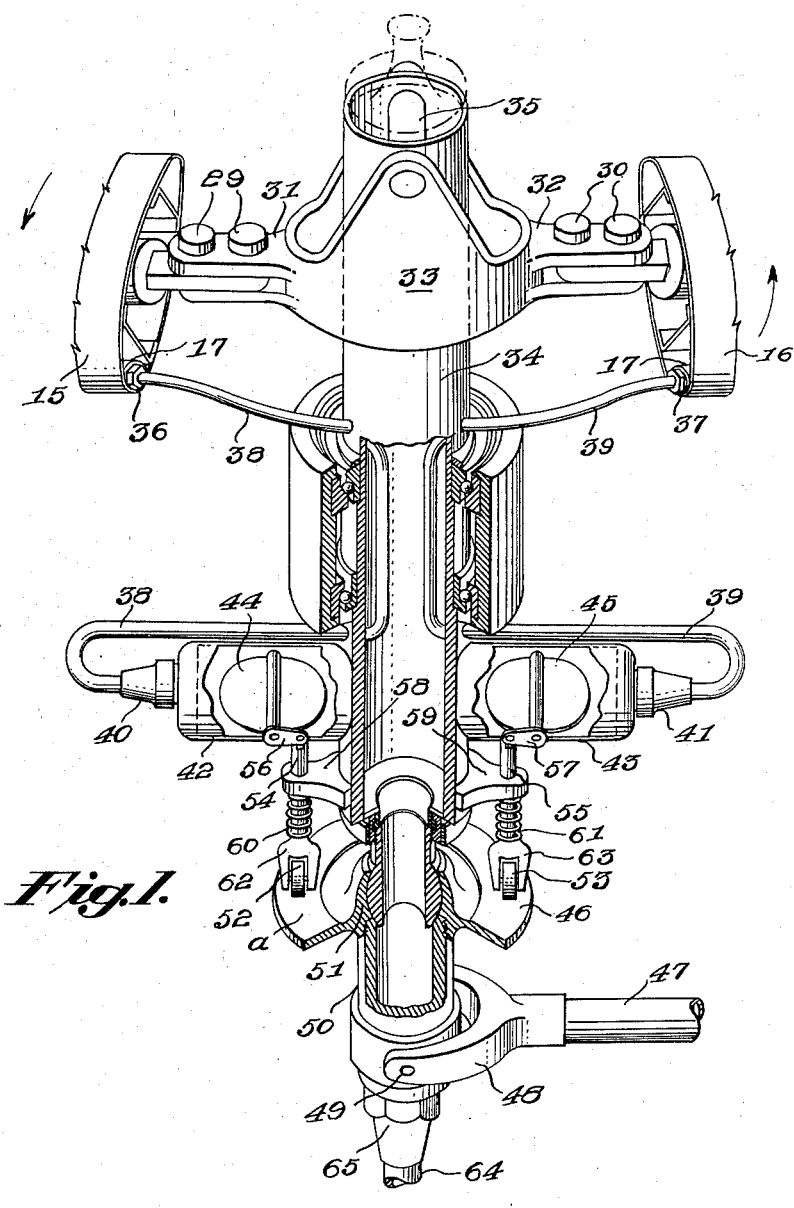
Figure 2:
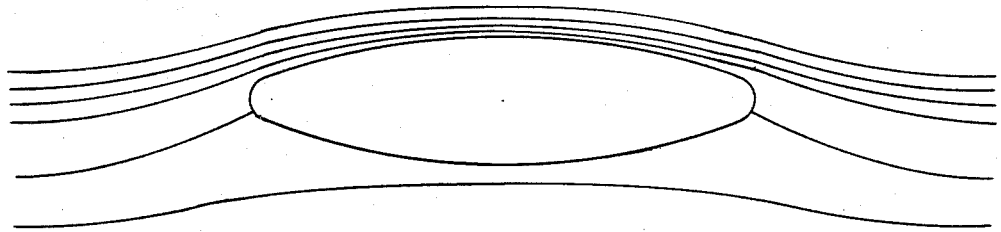
Figure 3:
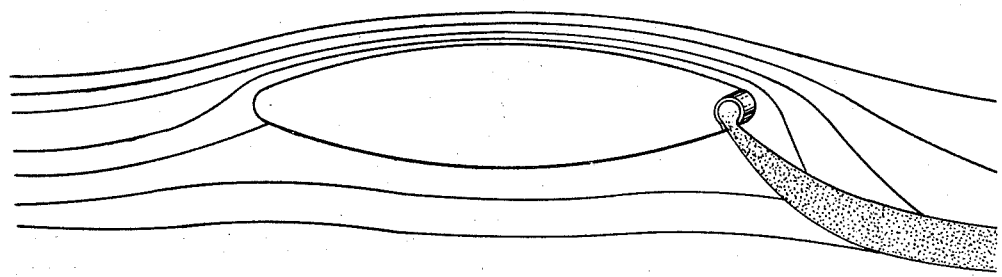
Figure 3 represents diagrammatically how the jet means provide a substantial approach to the above desired fluid flow pattern.
Figure 4:
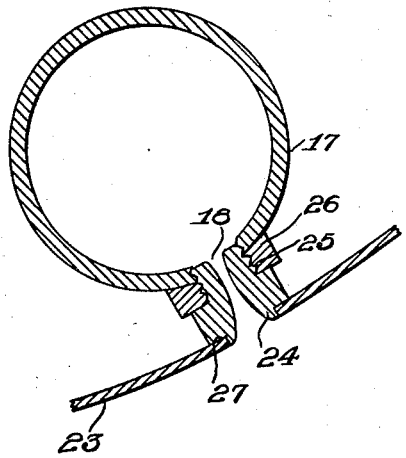
Figure 4 represents a cross-section of a fluid supply duct and a jet nozzle mounted in the trailing edge of the airfoil of a rotary blade.

Referring to the drawings in detail and first to Figures 1 through 5 there are illustrated two rotor blades 15 and 16 of a helicopter rotor system or the like. These blades or airfoils are shown in detail in the broken perspective view of Figure 5. The system is novel in that it utilizes jet means, such as the elongated tubes 17 with jet openings 18 formed or mounted therein along the length of the airfoils of each blade and located beneath the airfoil near or substantially at the trailing edge 19. The air foils have a central spar 20 and beams 21 and 22 over which the airfoil skin 23, see Figure 4, is formed in an oval shaped arrangement for the most desirous airfoil circulation. A pattern of the desired air flow for lift with zero incidence is illustrated in Figure 2. In order to have a substantially close approach to this high life flow pattern, the present trailing under edge jet controls are provided, so as to obtain the flow pattern of Figure 3, which is very close to the desired flow pattern of Figure 2.

The novel features of an airfoil, which is oval in cross section with a rounded leading edge and a rounded trailing edge combined with the novel effects of a jet stream placed along the rear calculated dividing streamline corresponding to a predetermined calculation may be defined and emphasized as by the following example:

Consider a circular cylinder moving through a stationary fluid. If the potential flow is calculated about a circular cylinder corresponding to an arbitrary circulation, the two symmetrical dividing streamlines are known, and a lift coefficient of $4\pi(C_L=12.6)$ is obtained, if the two stagnation points have come into coincidence at the bottom point of the cylinder. The general effect of the circulation is to increase the relative speed of the fluid at the surface above the stagnation points of the cylinder, and to diminish the speed at the surface below. Thus the pressure above the stagnation points is diminished and the pressure below is increased, and therefore there will be an upward force on the cylinder in the direction perpendicular to the flow direction. If a thin flap of certain short length or a jet stream be placed along the rear calculated dividing stream line corresponding to certain circulation, approximately the same lift would be produced on the cylinder.

Similarly the above theory holds true for an oval shaped airfoil instead of a cylinder, however, the magnitude of the lift coefficient is somewhat smaller depending on its thickness ratio. The means used to produce a very high lift on an airfoil of oval shape and the like by placing a thin flap or a jet stream at the calculated dividing streamline is called the circulation control airfoil.

The disclosure in the present application has suggested the use of a rotor blade having a cross-section shape which resembles an elongated oval with a blowing jet of fluid capable of being adjustably displaced with respect to the blade so as to attain the desired high lift. In this device, see Fig. 3 in the application, the air stream can flow upon the upper side of the blade around its rounded trailing edge, instead of the sharp trailing edge in the conventional blades, and smoothly off the rounded trailing edge with the jet stream where the circulation is created. Hence, a considerable increase in lift coefficient can be accomplished without the necessity of the change of the blade pitch angle. Thus, the present invention uses the principle of circulation control to produce high lift and to alternate lift force during flight.

In Figure 4 one detail of a jet structure is illustrated, for example, 24 is a jet nozzle formed with an exterior threaded reduced portion 25, which threads into the wall of a threaded opening in the tube 17 and is limited and locked in position by an internally threaded washer 26. The discharge end of the jet nozzle 24 may have an outwardly flared bore and is formed with an annular flange 27 adapted to provide a flush fit of the nozzle tip with the exterior of the airfoil skin surface 23.

The center spar 20, see Figure 5, is formed with a flattened lug-like end 28 bored through to provide for connection by rivets or bolts 29 and 30, see Figure 1 to the diametrically opposite radial bifurcated arms 31 and 32 of a mounting bracket 33 pivotally mounted on the hollow rotor post 34 by pin 35.

The jet tubes 17 are sealed off at the blade tips and are coupled by suitable fluid-tight coupling nuts 36 and 37 to fluid supply conduits 38 and 39, respectively. These conduits lead from coupling means 40 and 41, respectively, from valve chambers 42 and 43 diametrically extended from each side of the hollow rotor post 34. Butterfly valves 44 and 45 are mounted in the valve chambers 42 and 43, respectively, and the cyclically controlled by a swash plate 46 adapted to be tilted by a pilot control link 47 with a yoke 48 connected by cross pin 49 to a sleeve 50 operatively connected to the ball-joint portion 51 of the swash plate 46. The annular surface of the plate 46 is engaged by follower rollers 52 and 53 carried by roller shafts 54 and 55 connected by link members 56 and 57, respectively, to each respective butterfly valve 44 and 45. Each roller is shock mounted in a bracket 58 and 59 by springs 60 and 61 engaged at one end with the underside of the said brackets and each spring resting at the other end on the roller forks 62 and 63, respectively.

The jet means in the blades or airfoils 15 and 16 are supplied with air or gas from a suitable source in the fuselage by supply hose 64, which connects by coupler nut 65 to the hollow rotor post 34.

If the swash plate 46 is in level position the respective butterfly valves 44 and 45 will be in a position parallel to the air or gas flow, that is, wide open. This position of the valves provides the hovering condition of the rotary craft, a helicopter, for example, as all the blades give equal lift force. This is because the momentum of the blowing jets of all blades are equal.

If the pilot desires to descend or ascend vertically, he can decrease or increase the blowing quantity of the air or gas by adjusting the power plant, not shown, which is producing the jet power. Then for forward or sidewise flight and control due to gust, the pilot by rod 47 can tilt the swash plate 46 to any desired direction. The rods 54 and 55 are thus displaced, which in turn regulates the butterfly valves 44 and 45 cyclically. This gives the desired amount of fluid flow to the respective jet pipes in each blade 15 and 16 at any given azimuth position.

Figure 6 is a modification of the jet arrangement, wherein jets 18 are spaced and skewed from a low point X to a slightly higher level Y along the lenfth of a jet tube 17.

Another modification of the jet arrangements is illustrated in Figure 7, wherein the jets 18' are made progressively smaller from the root of the blade where the velocity is least to tip of the blade where the velocity is greatest, or vice versa in order to produce greater torque for the rotor.

While in Figure 7 there is disclosed a multiplicity of relatively closely spaced jet orifices, such orifices if increased to an infinite number would result in a slot 18a as indicated in Figure 7-A, which is capable of optional circulation.

This slot 18a may be of gradually decreased width from one end thereof to correspond with the structure of Figure 7 or the same may be of uniform width throughout its length.

Still another modification of the jet system is illustrated in Figures 8 and 9, wherein the swash plate 46', hollow rotor post 34' and airfoil construction are substantially the same as in Figure 1. However, the lift distribution may be collectively controlled to adjust the net lift of the rotor by providing an operator link 70 manually operated by the pilot and connected to the bifurcated lug 71 of a crank arm 72 fixed on an extension 73 of a jet pipe 74. This pipe 74 is mounted to turn in bearing means 75 carried by supporting bracket 76. Thus the jet directions may be collectively adjusted to hover conditions, of forward thrust and for ascending and descending. The jet directions may also be cyclically controlled by tilting the swash plate 46' when the link 70 is connected to the swash plate.

The swash plate 46' may be tilted to control the direction of the jet fluid by a butterfly valve 77 at the root of each jet pipe, see Figure 9. This operation is identical to that described for Figure 1.

Another form of this invention is disclosed in Figures 10 and 11 and provides for directing air or gas to jet means 80 and 81 located underneath the airfoil 82 at both edges of the same.

The control for this arrangement includes diametrically positioned butterfly valves 84 and 85 and a pair of fluid, that is, air or gas diverter valves 83 and 86 positioned in valve chambers 84ª and 86ª on each side of a hollow rotor post 87. These chambers are supplied with the jet fluid through openings 87ª and 87ᵇ leading thereto from the interior of the post 87 connected to a supply source. The valves 83 and 86 are controlled by a cam plate 88 and cam 89 for two positions of valves 83 and 86. The cam plate is formed with a depending annular collar 90 slidably and turnably mounted around an upwardly formed annuular bearing collar 91 carried by a cam plate support 92 fixed to the aircraft frame. The diverter valves 83 and 86 each are controlled by crank arms 93 and 94, respectively, which pivotally connect to the free ends of cam follower rods 95 and 96, respectively, each being formed with a roller fork 97 and a roller 98 journalled therein on an axle pin 99. The cam 89 has two positions, that is upper and lower positions, controlled by a lug 100ª from a control link, not shown. For example, at low flight speeds the lower cam position is inactive and suitable fluid, such as air or gas may be continuously supplied through the openings 87ª and 87ᵇ of post 87 and the valves to the trailing edge jet pipe 81, and at high flight speeds the upper cam position is active and cyclically diverts air to the leading edge by the diverter valves 83 and 86, see Figure 10.

The butterfly valves 84 and 85 are identical to those of Figure 1 and are controlled by a swash plate 100, which is tilted by a pilot control rod 101, yoke 102 and ball-joint arrangement 103 through follower rods 104 and 105 to each of the respective butterfly valves to control the quantity of the air or gas supplied to the airfoil jets. These follower rods are each biased into contact with their respective cam surfaces and swash plate surfaces by coil springs 106, 107, 108 and 109.

Also, another arrangement of jet angles may be provided by Figure 12, wherein jets 110 and 111 are provided in the trailing edge 112 of airfoil 113. With this arrangement air is directed to either jet chamber 114 or 115 to control high speed by jets 110 or a low speed and hovering condition by jets 111.

Thus a novel rotor system is provided that utilizes rotor blades with circulation controlled by means of jets located beneath the airfoil near the trailing edge. As explained airfoil circulation determines the lift which is measured by a lift coefficient, designated "$C_L$." Hence, the blade $C_L$ can be directly controlled by means of the jets. The control of $C_L$ in a conventional airfoil must be effected by a change in incidence of the airfoil, since the angle of the conventional sharp trailing edge primarily controls the $C_L$. Thus it is disclosed and illustrated that the $C_L$ in the proposed rotor, therefore, can be varied by varying any one or a combination of the following:

(1) Airfoil incidence (as with a conventional airfoil).
(2) Jet location.
(3) Jet discharge angle.
(4) Jet velocity or mass flow (jet momentum).

The advantages of this type of jet control for an airfoil applied to a helicopter rotor, for example, are as follows:

(1) The rear stagnation point location is not dependent on a sharp trailing edge as in a conventional airfoil. This means that the airfoil need not have a sharp trailing edge. This should decrease structural problems. However, a sharp trailing edge may be retained for other reasons.

(2) Mechanical complexity can be greatly decreased, since the airfoil can be mounted with a fixed angle of incidence, the $C_L$ being controlled by the jets.

(3) Since the $C_L$ can be increased without a high angle of blade incidence, boundary layer separation problems are minimized and high $C_L$ values (five or larger) can be realized. This will allow the design of a much more favorable spanwise $C_L$ distribution than is now practical.

(4) The jet is inherently directed so that one component of the jet thrust aids the rotor rotation. Therefore, the power transmitted through the rotor shaft for rotation can be reduced or entirely eliminated by proper jet design.

While only several specific embodiments are hereinbefore illustrated and described, it is to be expressly understood that this invention is not intended to be limited to the exact formations, construction or arrangement of parts as illustrated and described because various modifications may be developed in putting the invention to practice within the scope of the appended claims.

What we claim is:

1. An airfoil oval shape in cross section for rotary wing aircraft having a rounded leading edge and a rounded trailing edge, and jet stream producing means in at least one of said edges, disposed along the under portion of the airfoil at the calculated dividing streamlines thereby controlling the circulation and increasing the coefficient of lift.

2. The structure according to claim 1 wherein said means is angularly adjustable to vary the direction of the jets for controlling circulation of a resulting air stream around the airfoil.

3. The structure according to claim 1 wherein said jet producing means comprises an elongated tube disposed lengthwise of the airfoil, and jet openings in the wall of said tube in spaced relation lengthwise thereof.

4. The structure according to claim 1 wherein said jet producing means comprises an elongated tube disposed lengthwise of the airfoil, and a jet opening in the wall of said tube in the form of an elongated slot.

5. The structure according to claim 4, wherein said slot is defined by walls converging from adjacent one end of the tube to the other end thereof.

6. The structure according to claim 3 wherein said openings are disposed in angular relation to the chord of the blade.

7. The structure according to claim 3, wherein said openings are of varying size from one end of the tube toward the other end.

8. The structure according to claim 3, wherein said airfoil comprises a central longitudinally disposed spar and a longitudinally disposed beam between said spar and each edge of the airfoil, an airfoil skin supported on said spar and said seams, and said tube being disposed between one of said beams and the adjacent edge of the airfoil adjacent said skin, thereof.

9. The structure according to claim 8 wherein said jet openings are provided by longitudinally spaced nozzles whose outer ends are engaged with said skin and whose inner ends are threaded into topped openings in said tube.

10. A rotary wing aircraft comprising a hollow post, means for supplying air under pressure through the post, hollow oval airfoil means having an inner post adjacent portion and a tip mounted for rotating on said post, an air conveying conduit extending from the post to said blade means at the root portion thereof, jet tubes mounted in the airfoil means and extending spanwise and along the trailing edge thereof, means connecting the conduits to the jet tubes, said jet tubes having jet nozzles therein opening into the air stream below said trailing edge, said jet nozzles being angularly positioned to induce a desired circulation pattern around the airfoil adapted to greatly improve the coefficient of lift thereof during the retreating movement of the blade means during rotation of the same.

11. The structure according to claim 10, together with means for cyclically controlling the supply of air to said jet tubes with respect to the said retreating movement of the said blades.

12. The structure according to claim 10, wherein a bracket is pivotally supported on said post, said air foil means being connected to said bracket.

13. A rotary wing air craft comprising a hollow post, a bracket pivotally connected to said post, a pair of air foils of oval cross section form having adjacent ends thereof connected to said bracket, a tube in each of said airfoils adjacent one edge thereof, jet nozzles in said tubes opening through said airfoils, a pair of air or gas chambers disposed at diametrically opposite positions on on said post, means for supplying air or gas to said chambers, conduits disposed between said chambers and said tubes for providing the latter with jet forming gas, a normally opening butterfly control valve in each chamber and means supported by said post for cyclically operating said valves for unequal distribution of air or gas to said tubes in synchronism with the forward and retreating movement of said airfoils during rotation.

14. The structure according to claim 13, wherein said last-named means comprises a swash plate, means for rocking said plate, and means dishposed between said plate and said valves for operating the latter in conformity with the movement of said plate.

15. A rotary wing air craft comprising a hollow post, a bracket pivotally connected to said post, a pair of airfoils of oval cross sectional form having adjacent ends thereof connected to said bracket, a tube in each of said airfoils adjacent one oval edge thereof, jet nozzles in said tubes opening through said airfoils, a pair of gas chambers disposed at diametrically opposite positions on said post, means for supplying gas to said chambers, conduits disposed between said chambers and said tubes for providing the latter with jet forming gas, a normally opening butterfly control valve in each chamber and means supported by said post for cyclically operating said valves for unequal distribution of gas to said tubes in synchronism with the forward and retreating movement of said airfoils during rotation, a second nozzle provided tube within each airfoil adjacent the opposite edge thereof, a diverter valve in each of said chambers, and cam means for operating said diverter valves, for selective admission of gas to one or the other of said tubes.

16. A rotary wing air craft comprising a hollow post, a bracket pivotally connected to said post, a pair of airfoils of oval cross sectional form having adjacent ends thereof connected to said bracket, a tube in each of said airfoils adjacent one oval edge thereof, jet nozzles in said tubes opening through said airfoils, a pair of gas chambers disposed at diametrically opposite positions on said post, means for supplying gas to said chambers, conduits disposed between said chambers and said tubes for providing the latter with jet forming gas, a normally opening butterfly control valve in each chamber and means supported by said post for cyclically operating said valves for unequal distribution of gas to said tubes in synchronism with the forward and retreating movement of said airfoils during rotation, and means for rotating said tubes on their axis for varying the angularity of said jet nozzles.

17. A rotary wing aircraft comprising a post, a pair of airfoils of generally oval cross sectional form, means connecting adjacent ends of said airfoils to said post, a tube disposed within each airfoil adjacent an edge thereof, jet nozzles in said tubes opening through said airfoils, and means for admitting gas to said tubes, said tubes being supported within said airfoils for rotation about their axis and means for rotating the tubes for variable angular disposition of the nozzles therein.

18. The structure according to claim 17, together with means for selectively varying the mass of air or gas flow admitted to the tubes.

19. A rotary wing aircraft comprising a post, a pair of airfoils of generally oval cross sectional form, means connecting adjacent ends of said airfoils to said post, a tube disposed within each airfoil adjacent an edge thereof, jet nozzles in said tubes opening through said airfoils, and means for admitting gas to said tubes, a second nozzle provided tube within each airfoil adjacent the opposite edge thereof, and means for varying the volumes of gas admitted to the two tubes in each airfoil.

20. In a rotary wing aircraft a pair of opposed air foils of generally oval cross sectional form in the provision of a leading rounded edge and a rounded trailing edge, a pair of adjacent gas chambers adjacent one rounded edge thereof, a series of jet openings in the rounded edges of said airfoils communicating with each of said chambers, and means for selectively admitting gas to said chambers.

21. A method of inducing circulation of air transverse an airfoil, which comprises providing a jet stream at the rear of the calculated dividing streamline to utilize the vertical component of the jet stream to provide an approach to a maximum coefficient of lift of the airfoil.

22. A method of inducing circulation of air transverse an airfoil which comprises providing a jet stream at the rear of the calculated dividing streamline to utilize the horizontal component of the jet stream to provide torque for the rotor rotation.

References Cited in the file of this patent

UNITED STATES PATENTS

| | | |
|---|---|---|
| 1,099,083 | Duc | June 2, 1914 |
| 1,344,661 | Strong | June 29, 1920 |
| 1,569,607 | Beck | Jan. 12, 1926 |
| 2,041,787 | Stalker | May 26, 1936 |
| 2,412,908 | Platt | Dec. 17, 1946 |
| 2,481,749 | Hiller | Sept. 13, 1949 |
| 2,498,283 | Lee | Feb. 21, 1950 |